(12) United States Patent
Phillips

(10) Patent No.: US 6,191,200 B1
(45) Date of Patent: Feb. 20, 2001

(54) EXTENDED LIFE FLUORESCENCE POLYVINYL CHLORIDE SHEETING

(75) Inventor: Edward D. Phillips, Oakville, CT (US)

(73) Assignee: Reflexite Corporation, Avon, CT (US)

(*) Notice: Under 35 U.S.C. 154(b), the term of this patent shall be extended for 0 days.

(21) Appl. No.: 09/233,965

(22) Filed: Jan. 20, 1999

Related U.S. Application Data

(60) Provisional application No. 60/072,026, filed on Jan. 21, 1998.

(51) Int. Cl.⁷ ............................ C08K 5/34; B32B 27/36
(52) U.S. Cl. ........................................ 524/102; 428/412
(58) Field of Search ............................ 428/412; 524/102

(56) References Cited

U.S. PATENT DOCUMENTS

| | | | |
|---|---|---|---|
| 4,238,384 | 12/1980 | Blumberg et al. | 260/37 |
| 4,393,094 | 7/1983 | Garrett, Jr. et al. | 427/44 |
| 5,004,770 | 4/1991 | Cortolano et al. | 524/99 |
| 5,135,568 | 8/1992 | Fasano | 106/20 |
| 5,387,458 | 2/1995 | Pavelka et al. | 428/141 |
| 5,415,911 | 5/1995 | Zampa et al. | 428/40 |
| 5,470,502 | * 11/1995 | Hahn et al. | 252/301.35 |
| 5,605,761 | 2/1997 | Burns et al. | 428/412 |
| 5,618,626 | 4/1997 | Nagashima et al. | 428/429 |

FOREIGN PATENT DOCUMENTS

| | | |
|---|---|---|
| 0599208A1 | 11/1993 | (EP) . |
| WO 94/10588 | 5/1994 | (WO) . |
| WO 96/17012 | 6/1994 | (WO) . |
| WO 97/37252 | 10/1997 | (WO) . |
| WO 99/20688 | 4/1999 | (WO) . |

* cited by examiner

*Primary Examiner*—Kriellion Sanders
(74) *Attorney, Agent, or Firm*—Hamilton, Brook, Smith & Reynolds

(57) ABSTRACT

An extended life fluorescent polyvinyl chloride sheeting and a method for forming the sheeting are disclosed. The sheeting includes a polyvinyl chloride film having a fluorescent colorant incorporated therein. A protective polymer layer is attached to the polyvinyl chloride film. A light filtering agent is incorporated into the protective layer, wherein the filter agent blocks the 425 nm and lower wavelengths of the visible spectrum.

20 Claims, 3 Drawing Sheets

EXTENDED LIFE FLUORESCENCE POLYVINYL CHLORIDE SHEETING

RELATED APPLICATION

This present application claims priority to copending U.S. Provisional Patent Application No. 60/072,026, filed on Jan. 21, 1998. The entire teachings of the application are incorporated herein by reference.

BACKGROUND OF THE INVENTION

The advantages of the high visibility of fluorescent materials is well known. However, poor colorfastness in the presence of sunlight has made their use in some applications limited to short-lived, temporary applications. These applications include roadside work zone signs, vehicle conspicuity signs, etc.

Plasticized polyvinyl chloride has been used extensively for retroreflective sheeting applications. In roadside work zone applications, flexible, roll-up signage formed of polyvinyl chloride provides an improved safety upon impact by a vehicle over rigid signage. However, the fluorescent colored polyvinyl chloride signs can fade to a clear film quickly after consumed with lengthy exposure to ultraviolet light emitted by the sun. However, the retroreflective prism structure continues to function.

Some polymers, such as polycarbonate, that have a fluorescent colorant include a hindered amine light stabilizer compound.

SUMMARY OF THE INVENTION

The present invention includes an extended life fluorescent polyvinyl chloride sheeting and a method for forming the sheeting.

The sheeting includes a polyvinyl chloride film having a fluorescent colorant incorporated therein. A protective polymer layer is attached to the polyvinyl chloride film. A light filtering agent is incorporated into the protective polymer layer, wherein the filter agent blocks the 425 nm and lower wavelengths of the visible spectrum.

The method includes providing a polyvinyl chloride film having a fluorescent colorant incorporated therein. A protective polymer layer is attached to the polyvinyl chloride film. The protective polymer layer includes a light filtering agent that blocks the 425 nm and lower wavelengths of the visible spectrum, thereby forming the extended life fluorescent polyvinyl chloride sheeting.

The present invention has an advantage of providing fluorescent protection to a polyvinyl chloride sheeting while providing solvent resistance, printability, low coefficient of friction and can incorporate water shedding properties, such as hydrophobic and hydrophilic additives where desirable.

DETAILED DESCRIPTION OF THE INVENTION

Figure 1:
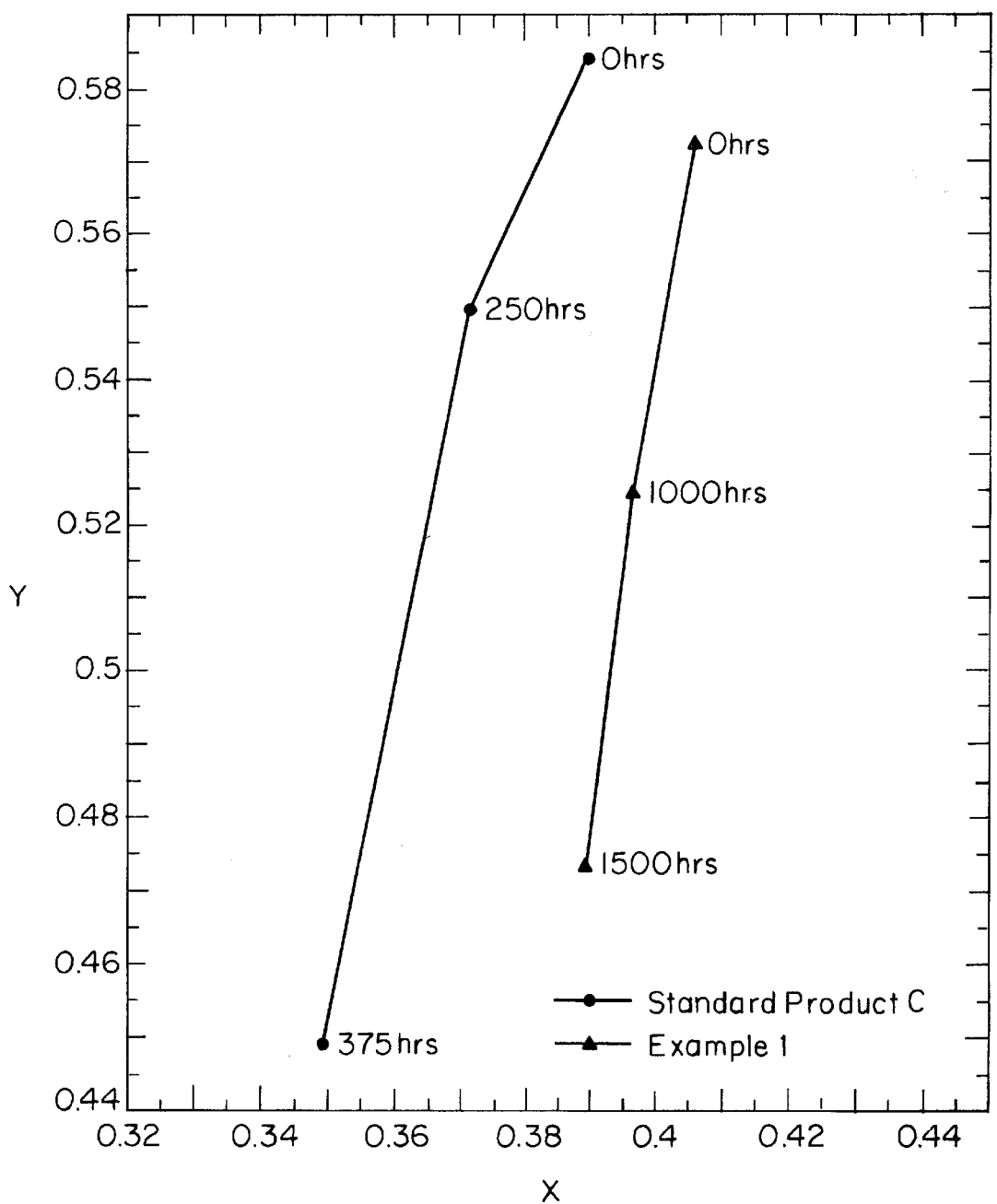
FIG. 1 is a chart of the results of an accelerated weathering color test of a first sample of the present invention and a first standard product.

The foregoing and other objects, features and advantages of the invention will be apparent from the following more particular description of preferred embodiments of the invention. All percentages and parts are by weight unless otherwise indicated.

Retroreflective materials are typically formed of a sheet of thermoplastic, which has a colorant mixed therein with the polymers. Attached to the sheet of thermoplastic is an array of cube-corner or prismatic retroreflectors as described in U.S. Pat. No. 3,712,706, issued to Stamm on Jan. 23, 1973, the teachings of which are incorporated herein in their entirety by reference. Generally, the prisms are made by forming a master die on a flat surface of a metal plate or other suitable material. To form the cube-corner, three series of parallel equidistant intersecting V-shaped grooves 60 degrees apart are inscribed in the plate. The die is then used to process the desired cube-corner array into a flat plastic surface. When the groove angle is 70 degrees, 31 minutes, 43.6 seconds, the angle formed by the intersection of two cube faces (dihedral angle) is 90 degrees and the incident light is retroreflected back to the source.

The efficiency of a retroreflective structure is the measure of the amount of incident light returned within a cone diverging from the axis of retroreflection. A distortion of the prismatic structure adversely affects the efficiency. Furthermore, cube-corner retroreflective elements have low angularity at some orientation angles, for instance, the elements will only brightly reflect light that impinges on it within a narrow angular range centering approximately on its optical axis. Low angularity arises from the inherent nature of these elements which are trihedral structures having three mutually perpendicular lateral faces. The elements are arranged so that the light to be retroreflected impinges into the internal space defined by the faces, and the retroreflection of the impinging light occurs by internal retroreflection of the light from face to face of the element. Impinging light that is inclined substantially away from the optical axis of the element (which is a trisection of the internal space defined by the faces of the element) strikes the face at an angle less than its critical angle, thereby passing through the face rather than being reflected. Further details concerning the structures and the operation of cube-corner microprisms can be found in U.S. Pat. No. 3,684,348, issued to Rowland on Aug. 15, 1972, the teachings of which are incorporated by reference herein in their entirety. The disclosed method is for forming cube-corner microprisms in a cooperatively configured mold. The prisms are bonded to sheeting which is applied thereover to provide a composite structure in which cube-corner microprisms project from one surface of the sheeting.

The array of retroreflectors includes optical elements that are known in the art, such as cube-corner prisms, four-sided prisms, Fresnel lenses, rounded lenses, etc. In one embodiment, the array of retroreflectors has a window side and a facet side. The array of retroreflectors are formed of a transparent flexible polymer polyvinyl chloride. Preferably, the polymer is cast in a mold with a monomer or oligomer, and the polymerization is initiated by ultraviolet radiation. Preferably, the array of retroreflectors is formed of cube-corner prism elements having a length along each cube side edge in the range of between about 0.003 and 0.02 inches (0.076 and 0.51 mm). In a preferred embodiment, the prism elements have a length along each cube-side edge in the range of between 0.0049 and 0.02 inches (0.124 and 0.51 mm). In a particularly preferred embodiment, each cube-side edge has a length of about 0.0049 inches (0.124 mm).

An adhesive can be applied to the prism facets for attaching a backing layer to the retroreflective structure. If an adhesive is employed on the prism facets, the adhesive can cause the surface of the prisms to wet, thereby destroying the air interface and eliminating the ability of the prism to retroreflect. As a result, the reflective coating is preferably deposited on the surface of the dihedral facets. Typically, the reflective coating is formed by sputtering aluminum, silver or gold or by vacuum metalization. Alternatively, metal lacquers, dielectric coatings and other specular coating materials can be employed.

The retroreflective structure 24 can be formed by numerous methods. Some of the methods for forming a retroreflective structure are disclosed in U.S. Pat. No. 3,684,348, issued to Rowland on Aug. 15, 1972; U.S. Pat. No. 3,689,346, issued to Rowland on Sep. 5, 1972; U.S. Pat. No. 3,811,983, issued to Rowland on May 21, 1974; U.S. Pat. No. 3,830,682, issued to Rowland on Aug. 20, 1974; U.S. Pat. No. 3,975,083, issued to Rowland on Aug. 17, 1976; U.S. Pat. No. 4,332,847, issued to Rowland on Jun. 1, 1982; U.S. Pat. No. 4,801,193, issued to Martin on Jan. 31, 1989; U.S. Pat. No. 5,229,882, issued to Rowland on Jul. 20, 1993; U.S. Pat. No. 5,236,751, issued to Martin et al. on Aug. 17, 1993; U.S. Pat. No. 5,264,063, issued to Martin on Nov. 23, 1992; U.S. Pat. No. 5,376,431, issued to Rowland on Dec. 27, 1994; U.S. Pat. No. 5,491,586, issued to Phillips on Feb. 13, 1996; U.S. Pat. No. 5,512,219, issued to Rowland on Apr. 30, 1996; U.S. Pat. No. 5,558,740, issued to Bernard et al. on Sep. 24, 1996; U.S. Pat. No. 5,592,330, issued to Bernard on Jan. 7, 1997; and U.S. Pat. No. 5,637,173, issued to Martin et al. on Jun. 10, 1997. The teachings of each patent are incorporated herein by reference.

The advantages of the high visibility of fluorescent materials is well known, but their poor colorfastness in the presence of ultraviolet light has made their use in some important applications, such as roadside work zone, vehicle conspicuity, etc., limited to short-lived, temporary applications.

Plasticized vinyl has been used extensively for retroreflective sheeting applications. In applications, such as roadside work zones, it has also been well established that flexible so-called "roll-up" signage usually made of highly plasticized polyvinyl chloride provide greatly improved safety upon impact over rigid signage.

The use of a free radical absorber of the hindered amine light stabilizer type, such as 2,2,6,6-tetramethyl piperdine, has been used to improve the colorfastness of polycarbonate colored with the thioxanthone, perylene imide, and thioindigold fluorescent colorants (U.S. Pat. No. 5,605,761).

It has been found that by use of a protective polymer layer or coating or film layer made of polyacrylate, polyurethane, or polyurethane acrylates which incorporate ultraviolet absorbers of the benzophenone or benzotriazole-type along with a light filtering agent which blocks out the short wavelengths of the visible spectrum (425 nm and lower) over a highly plasticized flexible fluorescent polyvinyl chloride sheeting containing a suitable hindered amine, colorfastness can be greatly improved. The wavelengths of visible light extend between about 400 nm for the extreme violet and about 720 nm for the deep red. The visible light filtering agent should impart color that can obscure the desirable daytime visibility of the fluorescent product. A suitable visible light filtering agent is Color Index Solvent Yellow 93. A suitable amount of filtering agent is in a range of between about 0.05 and 5.0 percent. A preferred range is between about 0.1 and 1.5 percent. A suitable hindered amine for use with polyvinyl chloride is bis-(1,2,2,6,6-tetramethyl-4-piperidinyl) sebacate. A suitable amount of hindered amine is in a range of between about 0.1 and 7.0 percent. A preferred range is between about 0.2 and 1.5 percent.

Through selection of coating ingredients in the top coat protective polymer layer, the fluorescent protection features can be coupled with a wide variety of different performance properties including but not limited to cold temperature flexibility, solvent resistance, printability, low coefficient of friction, and specialized water shedding properties (i.e. hydrophobic, hydrophilic).

The colors of principal interest in the area of fluorescent retroreflective sheeting are lime-yellow and red-orange.

The base material of wavelength filtering layer can be a polymer film, such as polyvinyl chloride, polyacrylate, polyurethane, polyvinylidene chloride, fluoropolymer, or highly stabilized copolymers, such as vinylidene fluoride-hexafluoropropylene. This film can be laminated directly to fluorescent colored layer through heat and pressure in some cases, such as some urethanes, or by use of an adhesive layer. The thickness of the wavelength filtering layer can be in the range of between about 0.1 and 10 mils (0.00254 and 0.254 mm). The base material of the wavelength filtering layer can also be applied to the fluorescent colored layer as a coating. This coating can be solvent borne, water-based, two-part, or radiation curable in nature.

The wavelength filtering layer is protective to the colorant in the fluorescent colored layer by incorporation of ultraviolet light absorbers or selected colorants or both which can block the wavelengths that are destructive to the colorant but still allow the day bright color to be visible. The daytime visibility of the product can be temporarily enhanced by the incorporation of some fluorescent colorant into the wavelength filtering layer, provided that the wavelengths generated by fluorescent colorant in the filtering layer are not destructive to the primary fluorescent colorant in the fluorescent colored layer.

For the fluorescent colored layer, a base polymer of polyvinyl chloride is preferred. Incorporated into this layer is the primary fluorescent colorant of the product. The most commonly used, widely available, and lowest cost fluorescent colorants are the xanthene based fluorescent dyes. This group, which encompasses both the fluorenes and the fluorones, includes such as dyes as fluoresceins, rhodamines, eosines, phloxines, uranines, succineins, sacchareins, rosamines, and rhodols. The dyes are noted for their brilliant daytime colors, high intensity color compatible fluorescence, and poor light fastness. Other fluorescent dyes displaying better light fastness include pyranines, anthraquinones, benzopyrans, thioxanthenes and perylene imides.

The prism layer can be compression molded or cast directly onto the fluorescent colored layer or attached by means of a tiecoat. The prism layer can be formed of polyvinyl chloride, an acrylate or other suitable polymer.

This prismatic sheeting configuration can be sealed to any number of backing materials by radio frequency, thermal, or sonic welding methods. The daytime color saturation (chroma) properties of a transparent fluorescent material are increased if backed by a white layer, it is desirable to have the backing be white in color on the surface behind the prisms. Alternatively, the prismatic material can be metalized in an aesthetically appealing pattern and laminated to a white pressure sensitive substrate adhesive. Similarly, a pattern can be printed onto the film prior to casting, or onto the backs of the prisms after casting, using a white ink to enhance the daytime chroma. However, these methods enhance the daytime fluorescent color at the expense of some of the retroreflective area, because the non-metalized prisms that have their facets covered with adhesive do not maintain a differentiation in refractive index that is sufficiently large for internal reflection to occur.

Both of the latter construction alternatives have the advantage of not having an air gap in the construction behind the prism layer. Elimination of the air gap can help augment the physical durability of the sheeting, because each layer of the product has about 100% of its surface bonded to its adjacent layers.

If a reflective material that is environmentally stable yet whiter than aluminum can be coated onto the prism facets, it can allow a fully metalized product to have an adequate "cap Y" to produce a desired daytime color. Silver, chromium, gold, palladium, and platinum are also possibilities.

The product can conform to the Minnesota Department of Transportation Specification 1710 for Fluorescent Orange Retroreflective Sheeting for Use on Work Zone Traffic Control Devices, the teachings of which are incorporated herein by reference in their entirety. It defines a color box (see Product Testing Requirements and Specification section), reflectance limits (30 minimum new, 20 minimum to 45 maximum for weathered (500 Weatherometer hours)), and a table (B) of Minimum Coefficients of Retroreflection approximate the 1,300 hour color retention in a xenon lamp accelerated weathering device.

A series of test samples was prepared for accelerated weathering testing under ASTM G26. The teachings of ASTM G26 are incorporated herein by reference in their entirety.

EXAMPLE 1

A fluorescent lime (yellow-green) colored microprismatic product was formed having a polyvinyl chloride base film. The polyvinyl chloride base film was highly plasticized using phthalate monomeric plasticizers and a xanthene solvent yellow as a colorant with a benzophenone ultraviolet absorber additive having a thickness of about 250 $\mu$ thick. The film was further protected with a 7 $\mu$ thick topcoat based on a flexible urethane acrylate oligomer, and containing a benzotriazole ultraviolet absorber and a hindered amine light stabilizer, and C.I. Solvent Yellow 93. This configuration of polyvinyl chloride and additives absorbed eighty-five percent or more of the light having wavelengths of 450 nm and shorter.

EXAMPLE 2

A fluorescent orange colored microprismatic product was formed having a polyvinyl chloride base film. The 350 $\mu$ thick polyvinyl chloride base film was highly plasticized using phthalate monomeric plasticizers and colored with a fluorescent orange, thioxanthone colorant, a benzophenone ultraviolet absorber additive, and hindered amine light stabilizer. The film was further protected with a clear, 100 $\mu$ thick, polyvinyl chloride based top film containing a benzophenone ultraviolet absorber additive.

EXAMPLE 3

A fluorescent orange colored microprismatic standard Product A was formed having a polyvinyl chloride base film. The 250 $\mu$ thick, polyvinyl chloride base film was highly plasticized using phthalate monomeric plasticizers and a mixture of a xanthene solvent yellow and rhodamine B as colorants.

EXAMPLE 4

A fluorescent orange colored microprismatic standard Product B was formed having a polyvinyl chloride base film. The polyvinyl chloride base film is highly plasticized using phthalate monomeric plasticizers. The film was made from a lamination of two 150 $\mu$ thick polyvinyl chloride films. The first polyvinyl chloride film included a non-fluorescent but very light stable combination of a transparent diazo yellow and organic red pigments. The second polyvinyl chloride film included the highly fluorescent but comparatively fugitive combination of colorants used in Standard Product A.

EXAMPLE 5

A fluorescent lime (yellow-green) colored microprismatic standard Product C was formed having a polyvinyl chloride base film. The 250 $\mu$ thick, polyvinyl chloride base film was highly plasticized using phthalate monomeric plasticizers and a xanthene solvent yellow colorant.

All of the aforementioned Examples 1–5 included the same microprismatic array composed of a cross-linked acrylated urethane ester. Each of the prismatic films was sealed by radio frequency welding to a polymeric plasticized, opaque white, textured, polyvinyl chloride backing material for purposes of this accelerated weather testing.

All of the samples were mounted onto an aluminum panel with pressure sensitive adhesive and tested in an Atlas model C35 Xenon Weatherometer in accordance with the ASTM G26 test method for a total of 1,500 hours. The teachings of ASTM G26 are incorporated herein in their entirety. The samples were evaluated periodically throughout the duration of the test for color change using a HunterLab LabScan II, LS-6000 Spectrophotometer.

Figure 2:
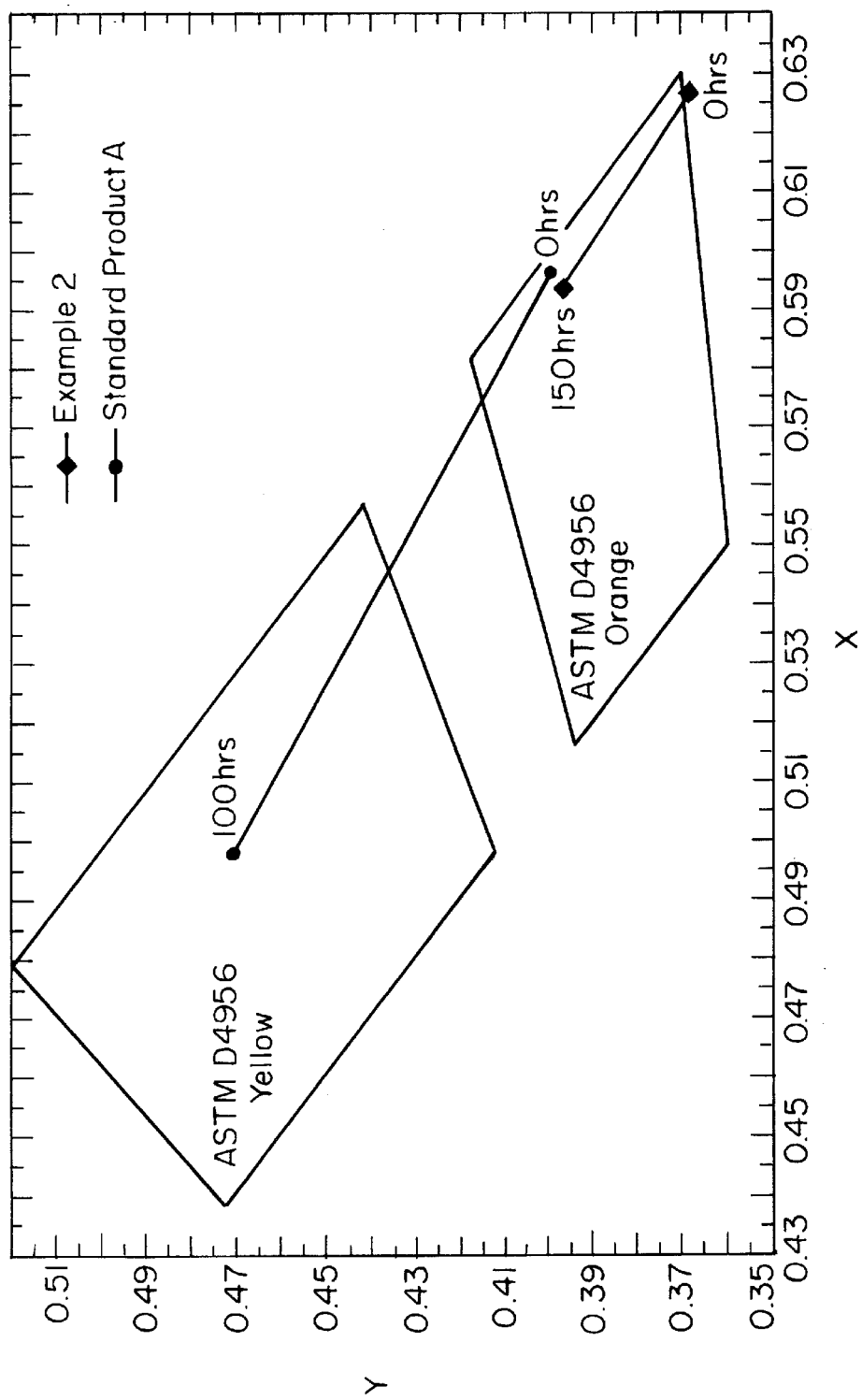
FIG. 2 is a chart of the results of an accelerated weathering color test of a second sample of the present invention and a second standard product.

Minimal movement in color coordinates can show color stability. The orange colorant in a standard product can fade to yellow (out of the color box) after approximately 48 hours in a carbon-arc Weatherometer while the orange colorant in a sample of the present invention can still be in the color box after fifteen hundred hours of exposure. An example of a color box is shown in FIG. 2 as defined by the orange color region boundary (Coordinate 1, x=0.550, y=0.360; Coordinate 2, x=0.630, y=0.370; Coordinate 3, x=0.581, y=0.418; Coordinate 4, x=0.516, y=0.394). The color box coordinates are disclosed in ASTM D4956-95, Table 10 for Color Specification Limits (Daytime) for white, yellow, orange, green, red, blue and brown. The teachings of ASTM D4965-95 are herein incorporated by reference in their entirety. Spectrophotometer or calorimeter having 45°/0° or 0°/45° illumination and viewing geometry is suitable for measuring color. Color coordinates are defined by tristimulus coordinates corresponding to the CIE 1931 Standard Colorimetric System by standard illuminant C.

FIG. 1 shows the degree of color change (distance moved) in CIE 1931 standard color space for Standard Product C (described in Example 5) after 375 hours of testing was greater than the sample described in Example 1 after 1,500 hours of exposure testing. The date point labels indicate hours of exposure in the Weatherometer.

FIG. 2 shows the rapid color change of fluorescent orange Standard Product A (as described in Example 3) after only 100 hours of exposure which resulted in a change in color from orange (0.595, 0.4) to yellow (0.498, 0.47) as compared to the color stability of a sample of the present invention, as described in Example 2, after 1,500 hours of exposure, which maintained its orange color.

Figure 3:
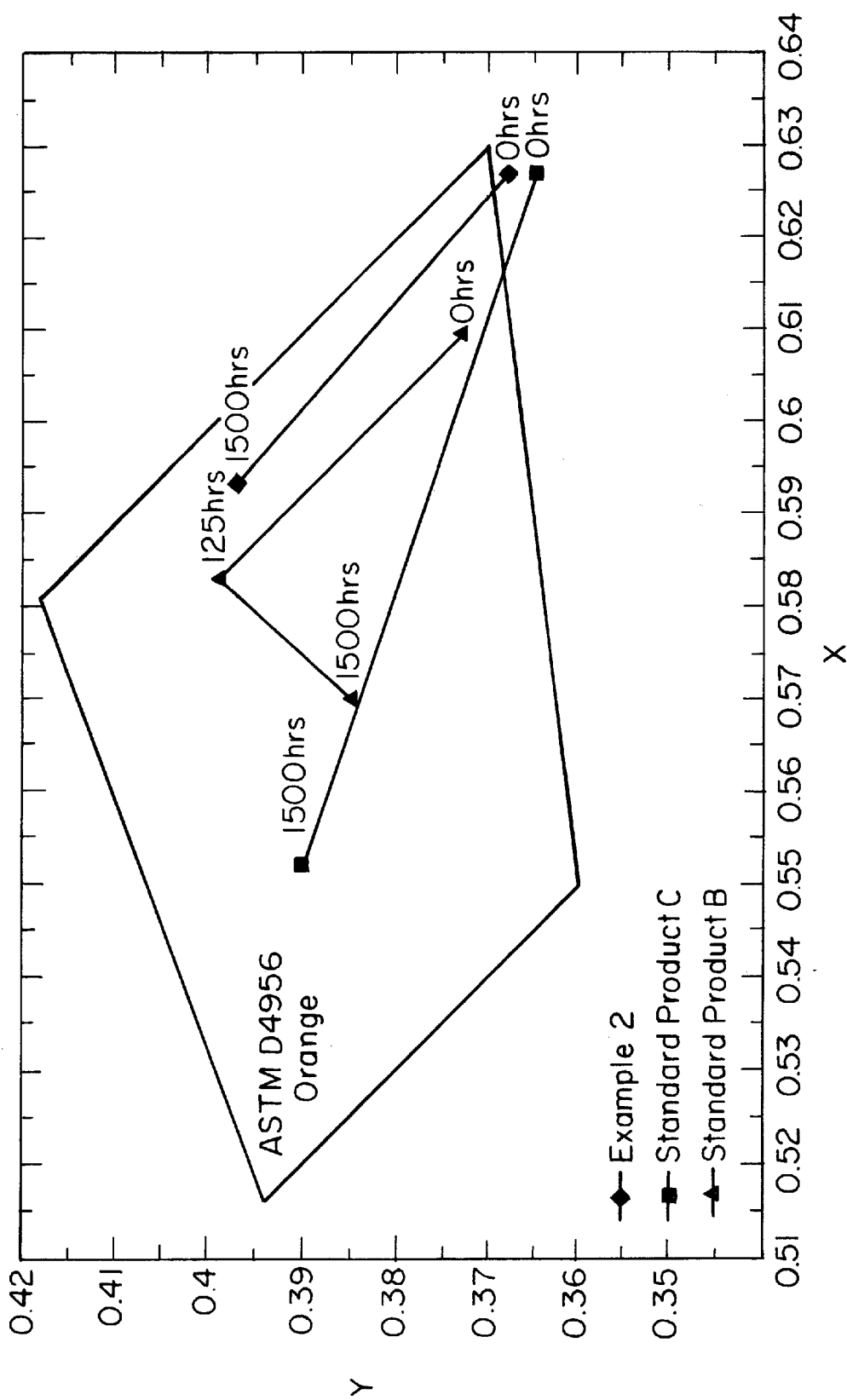
FIG. 3 is a chart of the results of an accelerated weathering color test of the second sample of the present invention and second and third standard products.

FIG. 3 shows the colorfastness performance of two commercially available products compared to the present invention as described in Example 2. Standard Product B (Example 4) exhibited rapid color change over the first 125 hours of exposure as the conventional fluorescent colorants faded and then became fairly stable between 125 hours and 1,500 hours when the non-fluorescent pigments are responsible for the color. The Standard Product C (Example 5) also demonstrated a greater over all color change than the embodiment of Example 2. A more significant fact is that the Standard Product C color loss direction indicates a more significant decrease in chroma (shift to the left). This loss of color saturation in the Standard Product C (Example 5) indicates that the embodiment of Example 2 can have better visibility in real world daytime applications.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. An extended life fluorescent polyvinyl chloride sheeting, comprising:
    a) a polyvinyl chloride film having a fluorescent colorant and hindered amine light stabilizer incorporated therein;
    b) a protective polymer layer, which is attached to said polyvinyl chloride film; and
    c) a light filtering agent, which is incorporated into said protective layer, said filtering agent blocks the 425 nm and lower wavelengths of the visible spectrum.

2. The sheeting of claim 1 wherein said protective layer includes an ultraviolet absorber.

3. The sheeting of claim 1 wherein said hindered amine includes bis-(1,2,2,6,6-tetramethyl-4-piperidinyl) sebacate.

4. The sheeting of claim 1 wherein said light filtering agent includes Color Index Solvent Yellow 93.

5. The sheeting of claim 1 wherein said protective polymer layer includes a polymer selected from the group consisting of polyacrylate, polyurethane, polyurethane acrylate, polyvinyl chloride, polyvinyl acetate and polyvinylidene chloride.

6. The sheeting of claim 2 wherein said ultraviolet absorber is selected from the group consisting of benzophenone and benzotriazole.

7. The sheeting of claim 1 wherein said protective layer has a thickness in the range of between about 0.2 and 15 mils.

8. The sheeting of claim 1 wherein said protective layer has a thickness in the range of between about 0.5 and 1.0 mil.

9. The sheeting of claim 1 wherein said polyvinyl chloride film includes a printed pattern.

10. The sheeting of claim 9 wherein said polyvinyl chloride film includes a printed pattern formed of a white ink to enhance daytime chroma.

11. The sheeting of claim 1 wherein the polyvinyl chloride film includes a metalized layer.

12. The sheeting of claim 11 wherein the metalized layer is formed of a metal selected form the group consisting of aluminum, chromium, gold, palladium, platinum and silver.

13. A retroreflective structure formed with the fluorescent polyvinyl chloride sheeting of claim 1.

14. A method for forming an extended life fluorescent polyvinyl chloride sheeting, comprising the steps of:
    a) providing a polyvinyl chloride film having a fluorescent colorant incorporated therein; and
    b) attaching a protective polymer layer to said polyvinyl chloride film, wherein said protective polymer layer includes a light filtering agent that blocks the 425 nm and lower wavelengths of the visible spectrum, thereby forming the extended life fluorescent polyvinyl chloride sheeting.

15. An extended life fluorescent sheeting, comprising:
    a) a polyvinyl chloride film having a fluorescent colorant and hindered amine light stabilizer incorporated therein;
    b) a protective polymer layer, which is attached to said polyvinyl chloride film wherein said protective polymer layer includes a polymer selected from the group consisting of polyacrylate, polyurethane, polyurethane acrylate, polyvinyl acetate and polyvinylidene chloride; and
    c) a light filtering agent, which is incorporated into said protective layer, said filtering agent blocks the 425 nm and lower wavelengths of the visible spectrum.

16. The sheeting of claim 15 wherein said protective layer includes an ultraviolet absorber.

17. The sheeting of claim 16 wherein said ultraviolet absorber is selected from the group consisting of benzophenone and benzotriazole.

18. The sheeting of claim 15 wherein said hindered amine includes bis-(1,2,2,6,6-tetramethyl-4-piperidinyl) sebacate.

19. The sheeting of claim 15 wherein said light filtering agent includes Color Index Solvent Yellow 93.

20. The sheeting of claim 16 wherein said protective layer has a thickness in the range of between about 0.2 and 15 mils.

* * * * *